(12) United States Patent
Iwata et al.

(10) Patent No.: US 7,433,013 B2
(45) Date of Patent: Oct. 7, 2008

(54) LIQUID CRYSTAL DISPLAY DEVICE MANUFACTURING METHOD, LIQUID CRYSTAL DISPLAY DEVICE MANUFACTURED WITH THE LIQUID CRYSTAL DISPLAY DEVICE MANUFACTURING METHOD, AND LIQUID-CRYSTAL-DISPLAY-DEVICE-MOUNTED ELECTRONIC DEVICE

(75) Inventors: Yuji Iwata, Suwa (JP); Kazuaki Sakurada, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 744 days.

(21) Appl. No.: 11/006,690

(22) Filed: Dec. 8, 2004

(65) Prior Publication Data
US 2005/0134791 A1    Jun. 23, 2005

(30) Foreign Application Priority Data
Dec. 17, 2003    (JP) .............................. 2003-419652

(51) Int. Cl.
*G02F 1/13* (2006.01)
(52) U.S. Cl. ...................................... 349/187; 349/192
(58) Field of Classification Search ........................ None
See application file for complete search history.

(56) References Cited

U.S. PATENT DOCUMENTS 4,656,171 A    4/1987    Austel et al.

(Continued)

FOREIGN PATENT DOCUMENTS

CN    1439924 A    9/2003

(Continued)

OTHER PUBLICATIONS

Rosenblum et al., Nucleic Acids Research, 1997, pp. 4500-4504, vol. 25.

*Primary Examiner*—Richard H Kim
(74) *Attorney, Agent, or Firm*—Oliff & Berridge, PLC (57) ABSTRACT

A manufacturing method of a liquid crystal display device enables decreasing the fraction defective of a liquid crystal panel upon manufacturing the liquid crystal display device using the liquid crystal dropping model in a large-sized board. The manufacturing method of a liquid crystal display device includes a preliminary liquid crystal coating process, a film thickness measurement process, a liquid crystal discharge condition calculation process, and a liquid crystal coating process. The preliminary liquid crystal coating process scans a plurality of the cell forming areas of the sample board with a droplet discharge head in a predetermined scanning direction, and coats the liquid crystal with a predetermined discharge condition. The film thickness measurement process respectively measures the film thickness of the liquid crystal coated onto the plurality of the cell forming areas. The liquid crystal discharge condition calculation process calculates the liquid crystal discharge condition to discharge to the plurality of the cell forming areas from the droplet discharge head, based on the measuring result of film thickness. The liquid crystal coating process scans the plurality of the cell forming areas of the first motherboard with the droplet discharge head in the predetermined scanning direction, and coats the liquid crystal in accordance with the liquid crystal discharge condition calculated.

6 Claims, 10 Drawing Sheets

U.S. PATENT DOCUMENTS

| | | | |
|---|---|---|---|
| 4,670,438 | A | 6/1987 | Austel et al. |
| 4,722,929 | A | 2/1988 | Austel et al. |
| 4,746,658 | A | 5/1988 | Austel et al. |
| 5,177,074 | A | 1/1993 | Allen et al. |
| 5,188,934 | A | 2/1993 | Menchen et al. |
| 5,366,860 | A | 11/1994 | Bergot et al. |
| 5,652,099 | A | 7/1997 | Conrad |
| 5,654,442 | A | 8/1997 | Menchen et al. |
| 5,728,525 | A | 3/1998 | Conrad |
| 5,728,529 | A | 3/1998 | Metzker et al. |
| 5,763,167 | A | 6/1998 | Conrad |
| 5,800,996 | A | 9/1998 | Lee et al. |
| 5,840,999 | A | 11/1998 | Benson et al. |
| 5,847,162 | A | 12/1998 | Lee et al. |
| 5,863,727 | A | 1/1999 | Lee et al. |
| 5,885,778 | A | 3/1999 | Menchen et al. |
| RE36,187 | E | 4/1999 | Townsend et al. |
| 5,936,087 | A | 8/1999 | Benson et al. |
| 5,939,292 | A | 8/1999 | Gelfand et al. |
| 5,945,526 | A | 8/1999 | Lee et al. |
| 6,008,379 | A | 12/1999 | Benson et al. |
| 6,020,481 | A | 2/2000 | Benson et al. |
| 6,025,505 | A | 2/2000 | Lee et al. |
| 6,027,709 | A | 2/2000 | Little et al. |
| 6,051,719 | A | 4/2000 | Benson et al. |
| 6,080,852 | A | 6/2000 | Lee et al. |
| 6,096,723 | A | 8/2000 | Menchen et al. |
| 6,096,875 | A | 8/2000 | Khan et al. |
| 6,111,116 | A | 8/2000 | Benson et al. |
| 6,121,296 | A | 9/2000 | Schramm et al. |
| 6,191,278 | B1 | 2/2001 | Lee et al. |
| 6,194,576 | B1 | 2/2001 | Nguyen-Ba et al. |
| 6,197,555 | B1 | 3/2001 | Khan et al. |
| 6,197,956 | B1 | 3/2001 | Randall et al. |
| 6,221,604 | B1 | 4/2001 | Upadhya et al. |
| 6,221,606 | B1 | 4/2001 | Benson et al. |
| 6,280,799 | B1 | 8/2001 | Okabe et al. |
| 6,500,650 | B1 | 12/2002 | Stanton et al. |
| 2003/0223030 | A1 * | 12/2003 | Byun et al. ............ 349/187 |
| 2005/0253995 | A1 | 11/2005 | Inoue et al. |

FOREIGN PATENT DOCUMENTS

| | | |
|---|---|---|
| CN | 1444081 A | 9/2003 |
| JP | A-2000-246887 | 9/2000 |
| JP | A-2002-90761 | 3/2002 |
| JP | A-2002-107740 | 4/2002 |
| JP | A-2002-148614 | 5/2002 |
| JP | A 2003-019790 | 1/2003 |
| JP | A-2003-215612 | 7/2003 |
| JP | A-2003-270652 | 9/2003 |
| JP | A-2003-295149 | 10/2003 |

* cited by examiner

LIQUID CRYSTAL DISPLAY DEVICE MANUFACTURING METHOD, LIQUID CRYSTAL DISPLAY DEVICE MANUFACTURED WITH THE LIQUID CRYSTAL DISPLAY DEVICE MANUFACTURING METHOD, AND LIQUID-CRYSTAL-DISPLAY-DEVICE-MOUNTED ELECTRONIC DEVICE

BACKGROUND OF THE INVENTION

1. Field of Invention

Exemplary aspects of the present invention relate to a manufacturing method of the liquid crystal display device, to a liquid crystal display device manufactured with the manufacturing method of the liquid crystal display device, and to a liquid-crystal-display-device-mounted electronic device. Specifically, exemplary aspects relate to the manufacturing method of liquid crystal display device that provides forming of a large-sized panel structure that contains a plurality of liquid crystal panel units by pasting together a first motherboard and a second motherboard with sealing material after dropping the liquid crystal, and manufacturing of plurality of liquid crystal panels by cutting the large-sized panel structure. It also relates to the liquid crystal display device manufactured with the manufacturing method of a liquid crystal display device, and to the liquid-crystal-display-device-mounted electronic device.

2. Description of Related Art

Droplet discharge devices, such as inkjet devices, etc., are used to form films in various kinds of electric devices. These droplet discharge devices have a droplet discharge mechanism called a "droplet discharge head". In the droplet discharge head, a plurality of nozzles are formed regularly. The droplet discharge device conducts drawing of patterns constituted of discharging material over a board that becomes a component of some products, by discharging droplets of discharging material (ink) from these nozzles.

The droplet discharge device supplies a predetermined amount of ink by discharging it from the droplet discharge head toward the board. A related art method to discharge ink is to form a plurality of nozzle orifices on the wall surface that composes a ink tank, as well as to place a piezoelectric device to match the direction of expansion and contraction so as to face each nozzle orifice. Alternative lamination of the electrode and piezoelectric material in a form of sandwich is suggested as a structure for this type of piezoelectric device. The ink in a cavity (ink retention) in the droplet discharge head is discharged by the pressure wave generated by a deformation of the piezoelectric device. This type of the droplet discharge head has a limitation in the viscosity of dischargeable ink. Thus, making it difficult to discharge high viscosity ink. Therefore, the control of discharge is conducted by heating the ink and reducing its viscosity. See Japanese Unexamined Patent Publication No. 2003-19790.

A "large-sized boards adhering model" can be used in the related art as a method for manufacturing a plurality of liquid crystal panels by pasting large-sized boards to each other, forming a large-sized panel structure that contains a plurality of liquid crystal panel units, and cutting the large-sized panel structure. Moreover, in order to reduce the number of production processes, a "liquid crystal dropping model" is used. A sealing material is formed without creating injection mouth, the liquid crystal is dropped into the center part, and then the boards are pasted together with the sealing material.

SUMMARY OF THE INVENTION

In the case of manufacturing liquid crystal panels using a large-sized board, it is necessary to keep the quantity of the liquid crystal dropped onto each cell constant. However, in the case where the above mentioned droplet discharge device is used, discharge quantity of the liquid crystal declines, due to a temperature drop in the droplet discharge head, or to a curvature variation of a ink-supply path associated with a line feed action of the droplet discharge head. Thus, target quantity for the liquid crystal coating may not be obtained. The cells with a smaller quantity of liquid crystal coated thereon turn out to be defective. Moreover, there will be a problem of producing many defective liquid crystal panels, if cells with a smaller quantity of liquid crystal coated thereon exist. The cell gaps in between the boards become uneven when the boards are pasted together with a sealing material and so the entire board cannot be pressurized with even pressure. Specifically, display surface irregularity, etc., occurs in the liquid crystal panel when pressurized with uneven pressure.

Exemplary aspects of the present invention, in light of the above-mentioned and/or other problems, provide a manufacturing method of a liquid crystal display device which enables decreasing the fraction defective of a liquid crystal panel upon manufacturing the liquid crystal display device using the liquid crystal dropping model in a large-sized board, a liquid crystal display device manufactured with the manufacturing method of a liquid crystal display device, and an electronic device mounted with the liquid crystal display device.

In order to address and/or solve the aforementioned and/or other problems, exemplary aspects of the present invention provide a manufacturing method of a liquid crystal display device providing dropping the liquid crystal to at least either one of a first motherboard and a second motherboard, forming a large-sized panel structure that contains a plurality of liquid crystal panel units by pasting together the first motherboard and the second motherboard with the sealing material, and cutting the plurality of liquid crystal panel units that contains a plurality of liquid panel units. Exemplary aspects of the present invention provide a preliminary liquid crystal coating process to coat with the liquid crystal, by scanning a plurality of cell forming areas of a sample board with a droplet discharge head in a predetermined scanning direction, and by discharging liquid crystal with a predetermined discharge condition. Exemplary aspects of the present invention also provide a film thickness measurement process, to respectively measure the film thickness of liquid crystal coated onto the plurality of cell forming areas, and a liquid crystal discharge condition calculation process, to calculate a liquid crystal discharge condition to discharge to the plurality of cell forming areas from the droplet discharge head, based on the measuring result of film thickness in the preliminary film thickness measurement process. Exemplary aspects of the present invention further provide a liquid crystal coating process, to coat with the liquid crystal in accordance with the liquid crystal discharge condition calculated in the droplet discharge condition calculation process, by scanning the plurality of cell forming areas at either side of the first motherboard or the second motherboard, in the predetermined scanning direction with the droplet discharge head.

By keeping the film thickness of liquid crystal constant in each cell forming area of the motherboard and by reducing or preventing the fluctuation of film thickness, it is possible to eliminate cell forming areas with smaller quantity of liquid crystal coated thereon. Thus the cell gaps in between the boards are even when the motherboards are pasted together with the sealing material and so the entire motherboard can be pressurized with even pressure. This enables reducing the fraction defective occurrence of the liquid crystal panels. Therefore, it is possible to provide the manufacturing method of liquid crystal display devices that can decrease the fraction defective of the liquid crystal panels, in the case where the liquid crystal dropping model is used for large-sized boards when producing the liquid crystal display device.

Moreover, according to a desirable mode of an exemplary the present invention, it is desired to individually calculate the liquid crystal discharge condition of the droplet discharge head for each cell forming area in the liquid crystal discharge condition calculation process, based on the film thickness of liquid crystal in the plurality of the cell forming areas, measured in the film thickness measurement process. The discharge quantity is determined individually for each cell forming area, based on the measured film thickness of each cell forming area, so it is possible to compensate for the difference between a theoretical value (a target film thickness) and an actual measured value (a measured film thickness) with high precision for each cell forming area.

Furthermore, according to an exemplary aspect of the present invention, in the liquid crystal discharge condition calculation process, the fluctuation pattern of the film thickness of liquid crystal measured in the film thickness measurement process on the plurality of the cell forming areas may be analyzed. Also the liquid crystal discharge condition of the droplet discharge head discharging to the plurality of cell forming areas in accordance with an analyzed fluctuation pattern may be calculated. This enables an easy compensation of the variation of the film thickness with regularity, thus enabling high precision compensation of the difference between the theoretical value (the target film thickness) and the actual measured value (the measured film thickness) for each cell forming area.

Further, according to an exemplary aspect of the present invention, it is desired to conduct the analysis of the fluctuation pattern of the film thickness of liquid crystal, either by the entire plurality of cell forming areas, by columns, or by rows. The analysis of the fluctuation pattern of the film thickness of liquid crystal can be conducted by the entire plurality of cell forming areas, or by columns, or by rows.

Moreover, according to an exemplary aspect of the present invention, the discharge condition may be set by the driving voltage waveform of the droplet discharge head and by the liquid crystal dropping frequency. This enables an easy modification of the discharge condition of the liquid crystal from the droplet discharge head.

Furthermore, according to an exemplary aspect of the present invention, the droplet discharge head may be warmed with a warming device. This enables to stabilize the discharge quantity of the liquid crystal by reducing the viscosity of the liquid crystal.

Moreover, according to an exemplary aspect of the present invention, the liquid crystal display device may be manufactured with the manufacturing method of a liquid crystal display device according to an exemplary aspect of the present invention. Thus, it is possible to provide the defect-less liquid crystal display device.

Further, according to an exemplary aspect of the present invention, the liquid crystal display device may be mounted on electronic appliances according to an exemplary aspect of the present invention. Herewith, it is possible to provide the electronic appliances with the defect-less liquid crystal display device thereon.

BRIEF DESCRIPTION OF THE DRAWINGS

FIGS. 6-1-6-3 are schematics explaining the preliminary process in an exemplary embodiment;

FIGS. 8-1-8-4 are schematics describing the manufacturing process of the liquid crystal panel in an exemplary embodiment; and FIGS. 9-1 and 9-2 are schematics of the personal computer equipped with the electric optic device in the present exemplary embodiment.

DETAILED DESCRIPTION OF EXEMPLARY EMBODIMENTS

The present exemplary embodiments according to the present invention will now be described in detail with reference to the drawings. Yet, it does not mean that the present invention will be limited by the present exemplary embodiment. The composing elements in the below exemplary embodiment include items which a person skilled in the art can easily envision, or are substantially the same. Further, the present exemplary embodiment is described using the passive-matrix type of liquid crystal display device. However, the liquid crystal display device of an exemplary aspect of the present invention shall not be limited to this type. Moreover, the present exemplary embodiment is described using the monochrome liquid crystal display device. However, the exemplary aspects of the present invention applied shall not be limited to the monochrome the liquid crystal display device.

Exemplary Embodiments

Droplet Discharge Device

Figure 1:
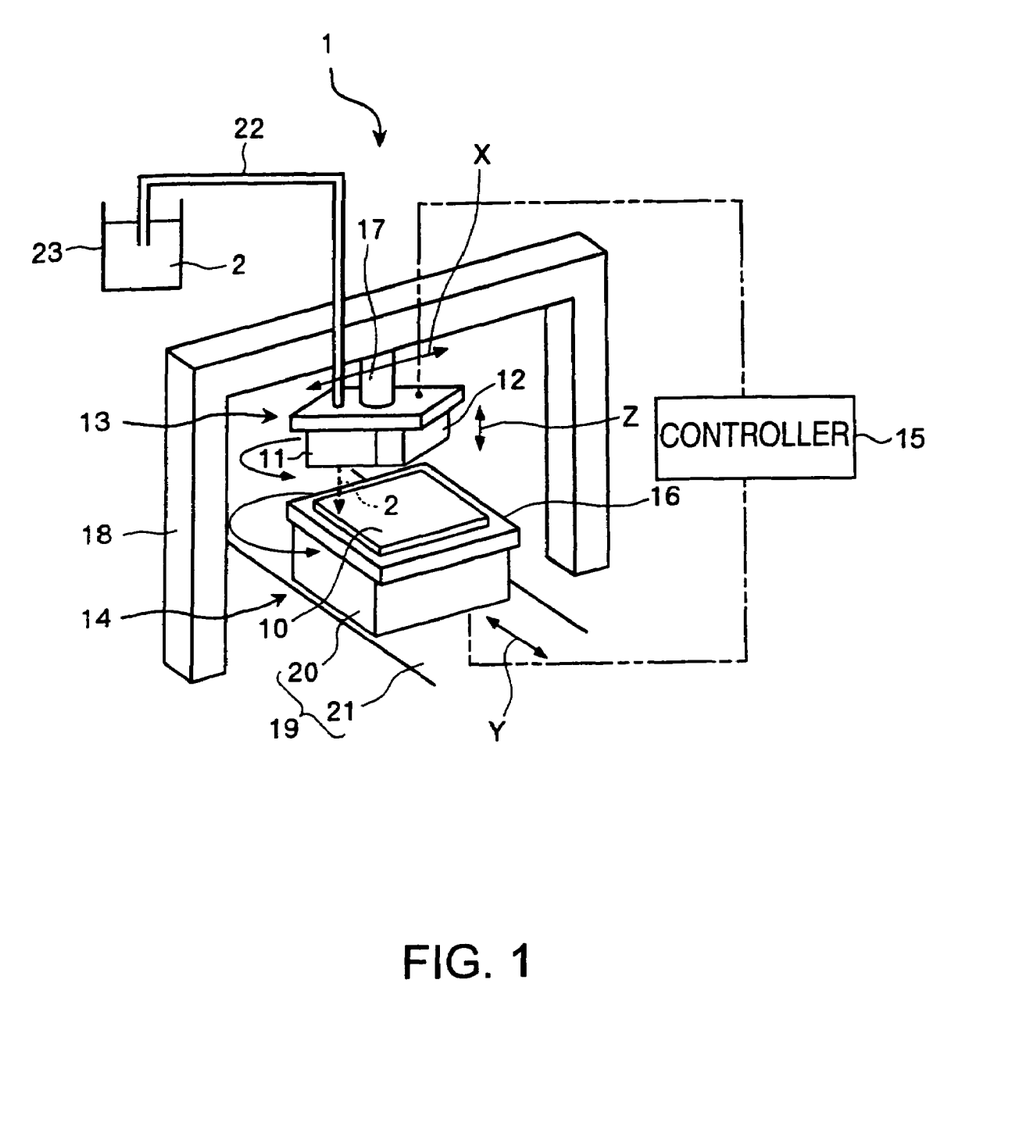
FIG. 1 is a schematic showing the entire structure of the droplet discharge device in an exemplary embodiment.

FIG. 1 is a schematic that shows the entire structure of a droplet discharge device 1 of an exemplary embodiment of the present invention. The droplet discharge device 1, as shown in FIG. 1, provides a structure including a droplet discharger 13, having a droplet discharge head 11 that discharges the coating liquid 2, such as liquid crystal etc., for example, on the board 10, and a film thickness measurer 12 that measures the film thickness of the coating liquid 2 coated onto the board 10. It also provides a structure including a controller 15, controlling a mover 14 to move the relative locations among the droplet discharge head 11, the film thickness measurer 12, and the board 10. In FIG. 1, for the sake of description, the droplet discharge head 11 and the film thickness measurer 12 are shown in magnification.

The mover 14 supports the droplet discharge head 11 and the film thickness measurer 12 downward, above the board 10 placed on a table 16. The mover 14 is also composed of a head support part 17 that can be freely moved along the X axis, by a stage 18 which is freely moved toward the lower side together with the support, and of a stage driver part 19 that moves together with the table 16 along the Y axis against the upper droplet discharge head 11.

The head support part 17 is provided with, for example, mechanisms of a linear motor and a stepping motor, etc. A linear motor mechanism can move the droplet discharge head 11 and the film thickness measurer 12 against the board 10 along the vertical axis (Z axis) thereof in any moving speed, and determine their location. A stepping motor mechanism can set the angle of the droplet discharge head 11 to any angle against the board 10, by rotating the droplet discharge head 11 around the vertical axis as a center.

The stage drive part 19 is composed of a θ axis stage 20 that can be set to any angle against the droplet discharge head 11 above by rotating the table 16 around the vertical axis as a center. In addition, θ axis stage 20 is provided with the stepping motor, etc., and a stage 21 is provided with the linear motor, etc.

The droplet discharger 13 composed of the droplet discharge head 11 and a tank 23 connected via a tube 22. The tank 23 retains the coating liquid 2, and supplies the coating liquid 2 to the droplet discharge head 11 through the tube 22. The liquid crystal material can be used for the coating liquid 2. Based on this structure, the droplet discharger 13 discharges the coating liquid 2 retained in the tank 23 from the droplet discharge head 11 and coats with it over the base 10.

Figure 2:
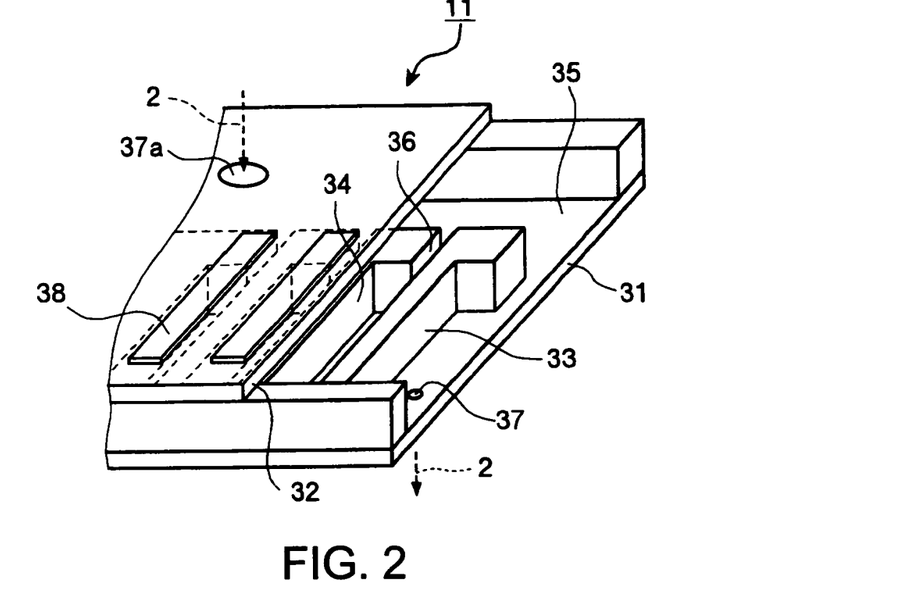
FIG. 2 is a schematic of the discharge head in an exemplary embodiment.
Figure 3:
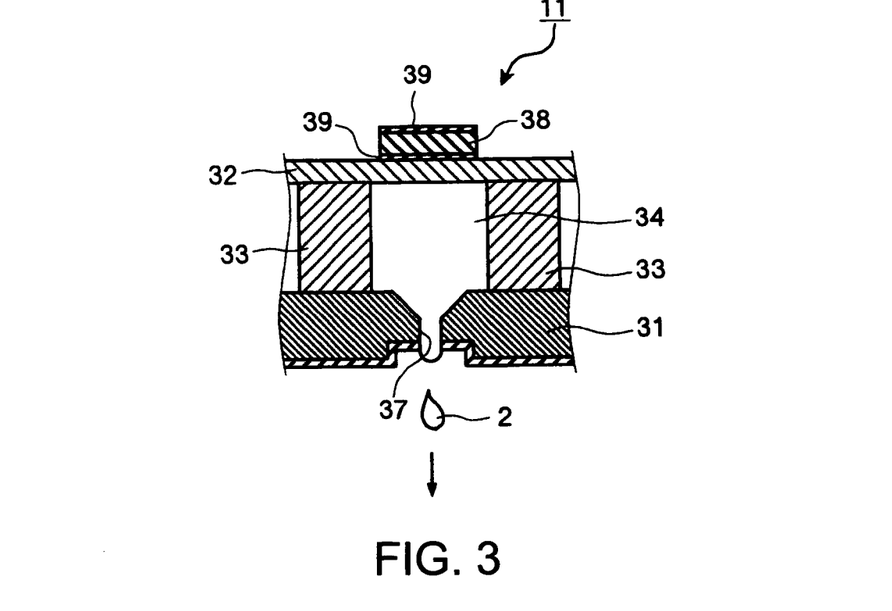
FIG. 3 is a schematic of the discharge head in exemplary embodiment.

The droplet discharge head 11, for example, compresses a liquid cellar by a piezo element, discharges the droplet (liquid material) with its pressure, and has plurality of nozzles (nozzle hole) arranged into one column or multiple columns. The structure of the droplet discharge head 11 is described in detail while referring to FIG. 2. FIG. 2 is a diagrammatic drawing of the droplet discharge head 11. FIG. 3 is a schematic of the droplet discharge head 11. As shown in FIG. 2 and FIG. 3 the droplet discharge head 11 is composed of, for example, a stainless nozzle plate 31 and a vibration plate 32, and structured by adhering the two via a separating material (a reservoir plate) 33. In between a nozzle plate 33 and a vibration plate 32, the separating material forms a plurality of spaces 34 and a liquid retention 35. The interior of each of the spaces 34 and the liquid retention 35 is filled with the coating liquid 2 (not shown), and the spaces 34 and the liquid retention 35 are continuously connected via a supply mouth 36. Moreover, in the nozzle plate 31, microporous nozzles 37 are formed to spray the coating liquid 2 from each of the spaces 34. In the vibration plate 32, a hole 37a is formed to supply the coating liquid 2 to the liquid retention 35.

A piezoelectric device (the piezo element) 38 is adhered to the surface opposite to the surface that is facing the space of the vibration plate 32, as shown in FIG. 2 and FIG. 3. This piezoelectric device 38, as FIG. 2 shows, is located in between a pair of electrodes 39 and 39, and is made to extend outward if the electricity is turned on. Moreover, based on this structure, the vibration plate 32 to which the piezoelectric device 38 is adhered simultaneously bends outward together with the piezoelectric device 38 and the cubage inside the spaces 34 increases. Thus, the coating liquid 2 that corresponds to the increased cubage flows into the spaces 34 from the liquid retention 35 through the supply mouth 36. Furthermore, if the electricity supply to the piezoelectric device 38 is turned off in such a state, the piezoelectric device 38 and the vibration plate 32 together resume their original shape. Hence the cubage of the spaces 34 also resume its original state, and the pressure of the coating liquid 2 inside the space increases. Thus, atomized droplets of the coating liquid 2 are discharged from the nozzle 37 to the board 10.

Moreover, a warmer constituted of a heater and a temperature sensor (not shown) is installed inside the droplet discharge head 11. The controller 15 controls the temperature of the warmer, based on the output of the temperature sensor, in order for the droplet discharge head 11 to be in the predetermined temperature. Hence, it is possible to set the coating liquid 2 discharged from the droplet discharge head 11 to the predetermined low viscosity status.

Instead of the piezo jet type system described above, another system can be used as the system for the droplet discharge head 11. The system can also be made to inject the coating liquid 2 from the nozzles 37 by providing vibration or by impressing the inside of the tank with an ultrasonic motor and a linear motor, etc.

The film thickness measurer 12 described above measures the film thickness of the coating liquid 2 coated onto the board 10 by the droplet discharge head 11, and outputs the measuring result of the film thickness to the controller 15. Any suitable method can be used as a film thickness measuring method. For example, the principle of ellipsometry (polarimetric analysis) or the optical interference type film thickness measurement technology can be used for measuring. Moreover, a measurement point when measuring the film thickness, can be either a method of measuring only a center point, or a method of measuring multiple points including the center point and using the mean value, etc.

The controller 15 described above may be composed of a CPU, such as microprocessor, etc. that conducts the control of the entire device, and computers etc. that have an input and output function for each signals. As shown in FIG. 1, it is connected to the droplet discharger 13 and to the mover 14 respectively, and controls the injecting action by the droplet discharger 13 and the moving action by the mover 14. Based on this structure, the discharge condition (the driving voltage waveform and the dropping frequency) of the coating liquid 2 is adjusted and the quantity of coating to form the thin film is controlled.

Specifically, to control the quantity of coating, the controller 15 includes; a control function to adjust a discharge interval of the coating liquid 2 to the board 10; a control function to adjust the per 1 dot discharge quantity of the liquid-form discharging liquid; a control function to adjust the angle θ between the alignment direction of the nozzles and the moving direction set by the moving mechanism; and a control function to set the discharging condition for each area by dividing the board into a plurality of areas.

Furthermore, the controller 15 is provided with the control functions in the control mechanism to adjust the above-mentioned discharge interval: a control function to adjust the speed of relative movement of board 10 and the droplet discharge head 11 in adjusting the discharge interval, a control function to adjust the time interval of discharge in the mover 14 by adjusting the discharge interval, a control function to arbitrarily set the nozzles that discharges the coating liquid 2 simultaneously out of a plurality of nozzles by adjusting the discharge interval, and a control function to adjust the temperature of the droplet discharge head 11 to the predetermined temperature by controlling the warmer within the droplet discharge head 11.

The Manufacturing Method of Liquid Crystal Display Device

Figure 4:
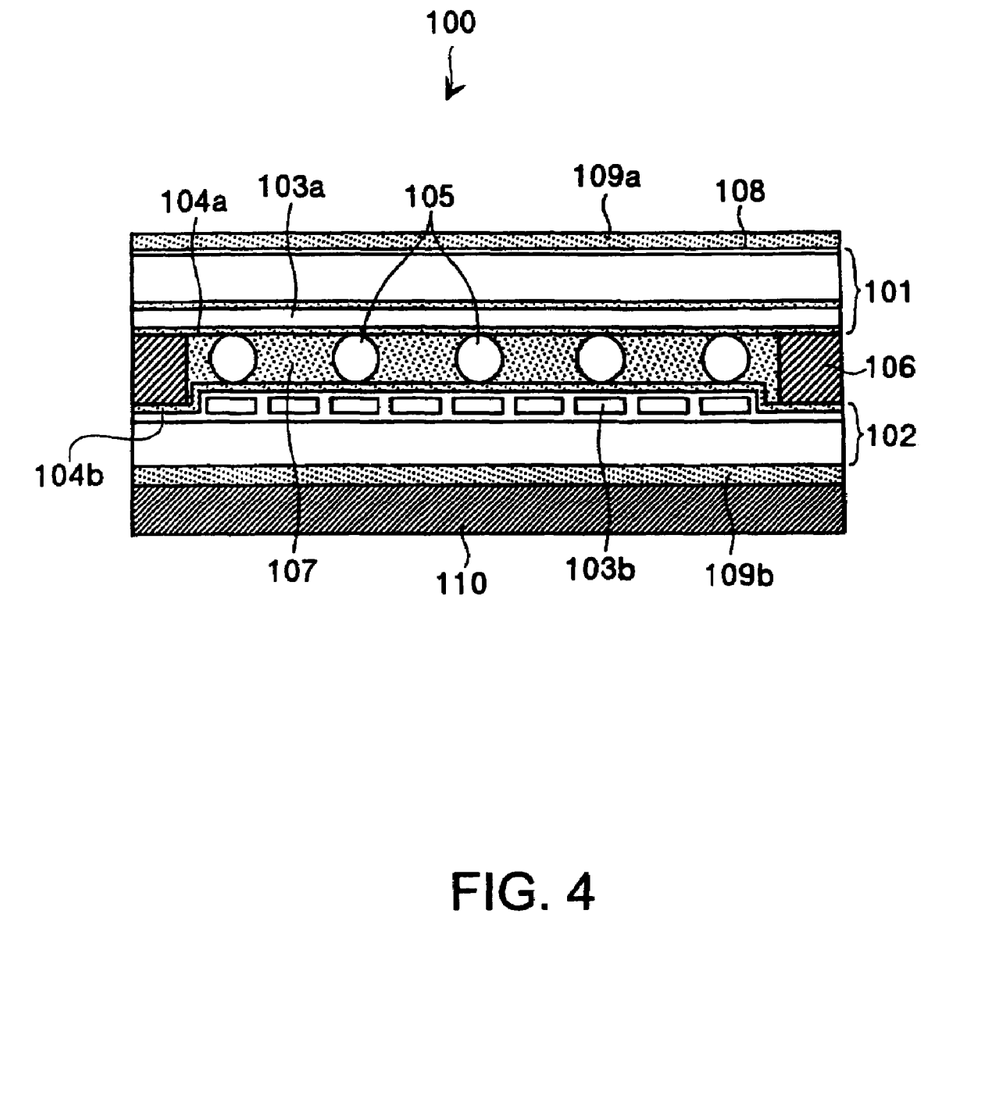
FIG. 4 is a schematic of the liquid crystal display device in an exemplary embodiment.

Referring to FIGS. 4 through 8, the case where the liquid crystal display device is manufactured, using the above mentioned droplet discharge device 1 will be described below. FIG. 4 shows the liquid crystal display device in the present exemplary embodiment in a schematic.

As shown in FIG. 4, a liquid crystal panel 100 of a liquid crystal display device includes: transparent conducting films 103a and 103b (indium tin oxide (ITO) film) on both of the surfaces of a main body glass board, an upper board 101 and a lower board 102 where an orientation film 104a and an orientation film 104b are formed thereon, the multiple spacers 105 that intervene both in between the upper board 101 and the lower board 102, a sealing material 106 to seal the space between the upper board 101 and the lower board, and the liquid crystal 107 filled into the space between the upper board 101 and the lower board 102. Furthermore, the liquid crystal display device 100 is laminated with a phase plate 108 and with a polarizing plate 109a on the back plane of the upper board 101 of the liquid crystal panel 100a. Moreover, a polarizing plate 109b and a backlight 110 are laminated onto the back plane of the lower board 102.

Figure 5:
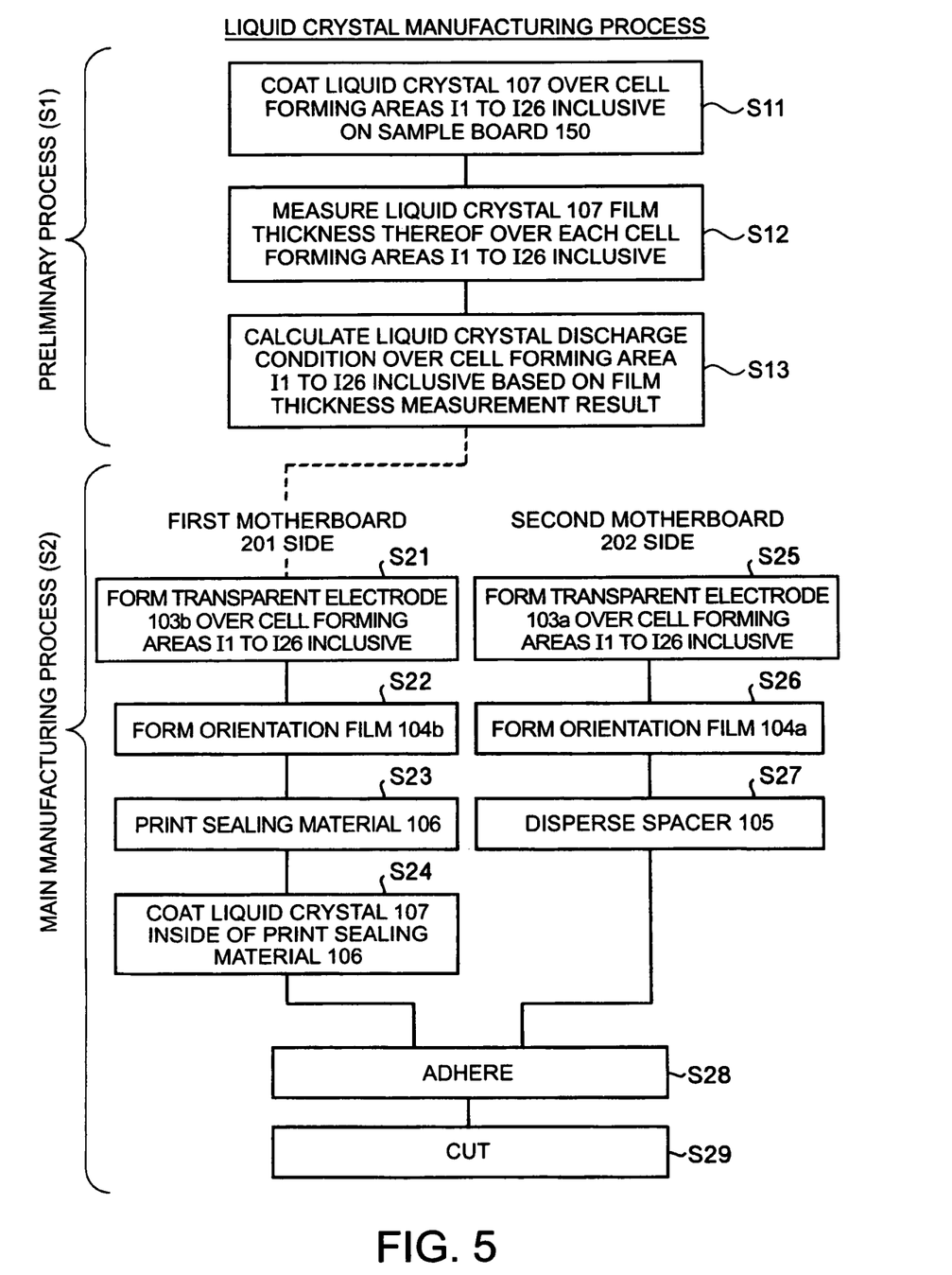
FIG. 5 is a schematic of an exemplary manufacturing process of the liquid crystal panel in an exemplary embodiment.
Figure 7:
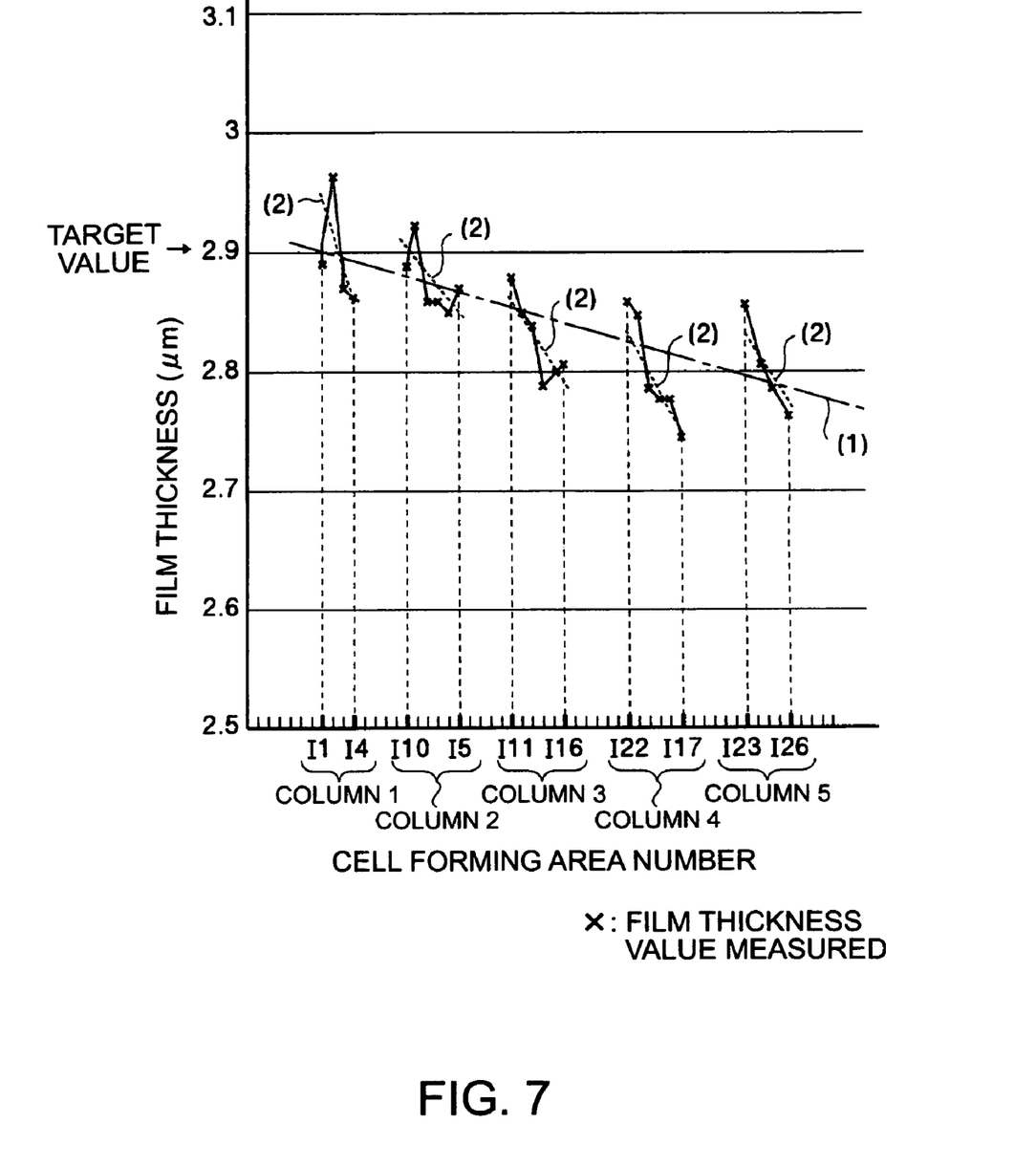
FIG. 7 is a graph that shows one example of the measuring results of the film thickness of the liquid crystal of each cell forming area on the sample board.

In the present exemplary embodiment, the example of manufacturing the plurality of liquid panels 100a in mass quantity at once, out of the large-sized glass board ("motherboard" thereafter), which is processed in a multifaceted way, is described. FIG. 5 is a schematic of the liquid crystal panel 100a. FIGS. 6-1-6-3 are schematics for describing the preliminary process. FIG. 7 is a graph of the measuring result of the film thickness of the liquid crystal of each cell forming area on the sample board. FIGS. 8-1 and 8-2 are schematics for describing the main manufacturing process. The manufacturing method of the liquid crystal panel 100a is described referring to FIGS. 5 through 8. In the present exemplary embodiment, the case of obtaining the 26 liquid crystal panels 100a from a first motherboard 201 and a second motherboard 202, shown in FIG. 8-1, and FIG. 8-2, is described. In the first motherboard 201 and the second motherboard 202, areas where the liquid crystal panels 100a are formed is called cell forming areas I1 through I26.

The manufacturing method of liquid crystal panel 100a shown in FIG. 5 is constituted of a preliminary process (S1) to determine the liquid crystal discharge condition of the droplet discharge head 11, and of a main manufacturing process (S2) to manufacture the liquid crystal panel 100a by conducting the coating of the liquid crystal according to the liquid crystal discharge condition determined by the preliminary process (S1). Normally, if liquid crystal is discharged from the droplet discharge head 11 with the discharge condition including the discharge quantity of liquid crystal corresponding to the target film thickness (the theoretical value), the film thickness normally becomes the target value (the theoretical value). However, as mentioned above, the discharge quantity of liquid crystal is sometimes reduced due to a temperature drop in the droplet discharge head, or to a curvature variation of a ink-supply path associated with a line feed action of the droplet discharge head 11, so that the actually-measured film thickness (the actual measured value) doest not attain the target (the theoretical value). In the present exemplary embodiment, in order to achieve the target film thickness, the liquid crystal discharge condition of the droplet discharge head 11 is calculated performing the preliminary process to compensate for the difference between the theoretical value and the actual measured value.

Figure 61:
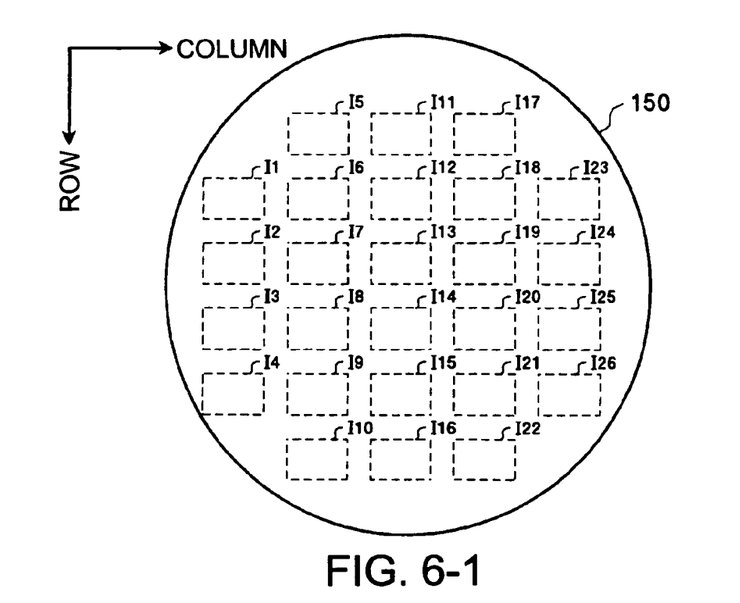

First, the preliminary process (S1) is described. The preliminary process (S1) includes, as shown in FIG. 5, a preliminary liquid crystal coating process (S11), a film thickness measurement process (S12), and a liquid crystal discharge condition calculation process (S13). A sample board 150 (refer to FIG. 6-1), which is the same size as the first motherboard 201 and the second motherboard 202, is placed horizontally and supported on the table 16 of the droplet discharge device 1 (shown in FIG. 1) facing up.

Figure 62:
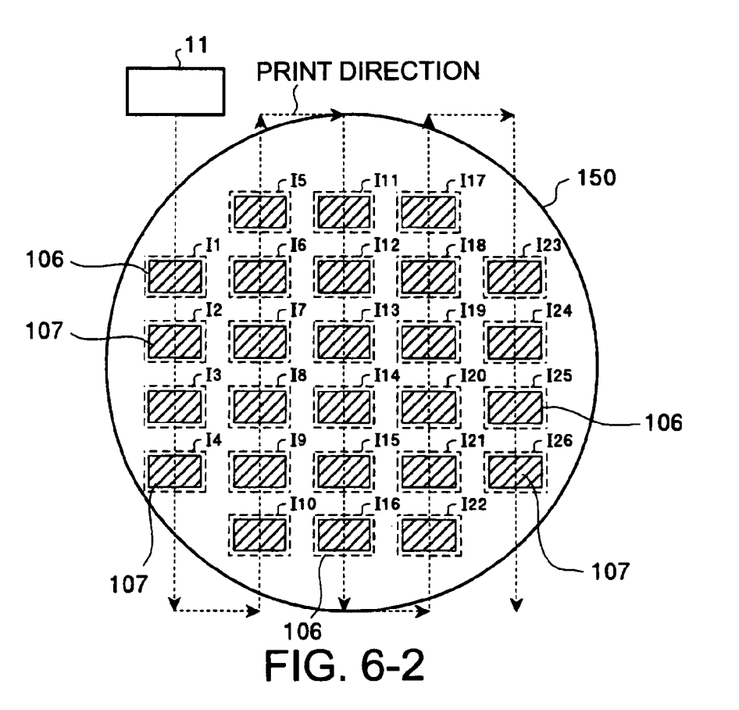

As shown in FIG. 6-2, the controller 15 of the droplet discharge device 1 lets the droplet discharge head 11 sequentially discharge the liquid crystal 107 with the same discharge condition (discharge condition of discharge quantity X) toward each of cell forming areas I1 through I26 on the surface of the sample board 150 (the preliminary liquid crystal coating process: S11). The liquid crystal 107 discharged from the droplet discharge head 11 spreads evenly with a prescribed thickness.

Figure 63:
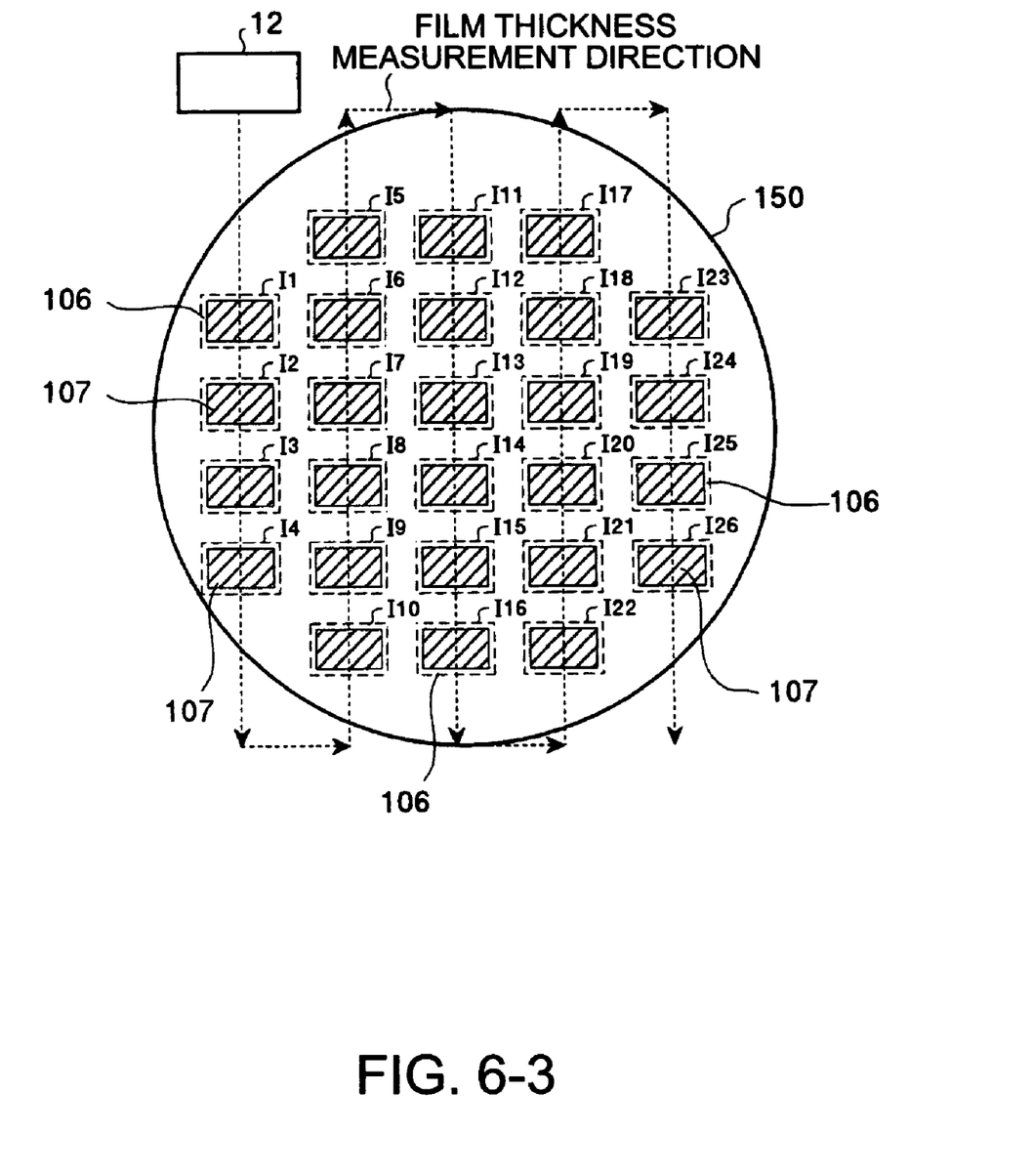

After that, as shown in FIG. 6-3, the controller 15 lets the film thickness measurer 12 measure the film thickness of the liquid crystal 107 coated onto each cell forming area I1 to I26 inclusive of the sample board 150 (the film thickness measurement process: S12). The film thickness measurer 12 outputs the measuring result of film thickness of the liquid crystal 107 for each of cell forming areas I1 to I26 inclusive of the sample board to the controller 15. The controller 15 calculates and stores the liquid crystal discharge condition (the discharge quantity) for each cell forming area I1 to I26 inclusive in the droplet discharge head 11, based on the measuring result of film thickness of the liquid crystal 107 for each cell forming area I1 to I26 inclusive (the liquid crystal discharge condition calculation process: S13). Moreover, it is desired that the measuring of film thickness use the plurality of the sample board 150 and determine the mean value as the measuring result of film thickness.

Regarding methods of calculating the liquid crystal discharge condition for each cell forming area I1 to I26 inclusive, there are methods to, (1) calculate the discharge condition individually for each cell forming area I1 to I26 inclusive, and to (2) calculate the discharge condition by analyzing the fluctuation pattern of the film thickness of liquid crystal within the cell forming areas I1 to I26 inclusive.

(1) The method to calculate the discharge condition individually for each cell forming areas I1 to I26 inclusive is described below.

The liquid crystal discharge condition (discharge quantity) is calculated individually for each cell forming area I1 to I26 inclusive, based on the measured film thickness. For example, if the target film thickness Aμm, and if the measured film thickness is A+a1μ, then the discharge quantity X1 in order to reduce the film thickness by a1 is determined, and, if the measured film thickness is A−a2μ, then the discharge quantity X2 to increase the film thickness by a2 is determined. Thus the discharge condition (the driving voltage waveform and the droplet dropping frequency) in order to discharge the determined discharge frequency is determined. With this method, it is possible to compensate for the difference between the theoretical value and the actual measured value with high precision for each cell forming area I1 to I26 inclusive, since the injection quantity is individually determined for every cell forming area I1 to I26 inclusive, based on the measured film thickness of each cell forming area I1 to I26 inclusive.

(2) The method to calculate the discharge condition by analyzing the fluctuation pattern of the film thickness of liquid crystal within the cell forming areas I1 to I26 inclusive is described below.

The liquid crystal discharge condition of the droplet discharge head 11 for each cell forming area I1 to I26 inclusive, is determined by analyzing the measured result of the film thickness with running the multivariate analysis of the liquid crystal, coated onto the cell forming areas I1 to I26 inclusive, and according to the result of the analysis. For example, if there is a tendency for film thickness to become thinner (the discharge quantity decreases), then it is controlled so that the discharge quantity gradually increases. Moreover, for example, if there is a tendency for film thickness to become thicker (the discharge quantity increases) every time the droplet discharge head 11 line feeds, then it is controlled so that the discharge quantity gradually decreases with every line feed. Specifically, the multivariate analysis is run on the film thickness of the liquid crystal, coated onto the cell forming areas I1 to I26 inclusive, and a double recursion formula for the film thickness is calculated. Based on the double recursion formula, the discharge quantity of liquid crystal is calculated so that the actual measured value matches the target film thickness. Further, based on the discharge quantity, the liquid crystal discharge condition is determined for each cell forming area I1 to I26 inclusive. The calculation of the double recursion formula of the measured film thickness is conducted by the entire cell forming areas I1 to I26 inclusive, or by columns, or by rows. If it is required to manage the film thickness with high precision, it is desired to conduct the calculation, either by column or by row.

FIG. 7 is a graph that shows one example of the measuring result of film thickness of the liquid crystal of each cell forming area I1 to I26 inclusive on the sample board 150. The example shown in this drawing shows the case where the film thickness decreases every time the line feed of the droplet discharge head 11 proceeds. Moreover, as the discharge time progress, the film thickness declines within the same column. In this figure, the horizontal axis indicates the number of the cell forming area, and the horizontal axis indicates the film thickness (μm). The target film thickness is set to 2.9 μm. In this figure, the double recursion formula for the entire cell forming areas I1 to I26 inclusive is expressed in formula (1), and the double recursion formula for each column of the cell forming areas I1 to I26 inclusive is expressed in formula (2). If it is required to manage the film thickness with high precision, the double recursion formula (2) for each column should be used, and if the precision is not required as much, then the double recursion formula (1 for the entire cell forming area should be used.

Hereafter, the main manufacturing process (S2) is described while referring to FIG. 5 described above. The main manufacturing process (S2) includes, as shown in FIG. 5, transparent electrode forming processes (S21 and S25), orientation film forming processes (S22 and S26), a seal printing process (S23), a liquid crystal coating process (S24), a spacers coating process (S27), an adhering process (S28), and a cutting process (S29).

Figure 81:
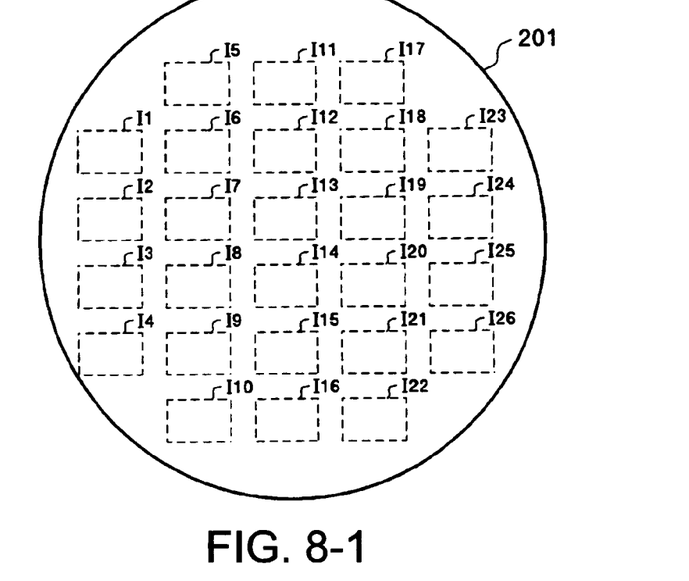
Figure 82:
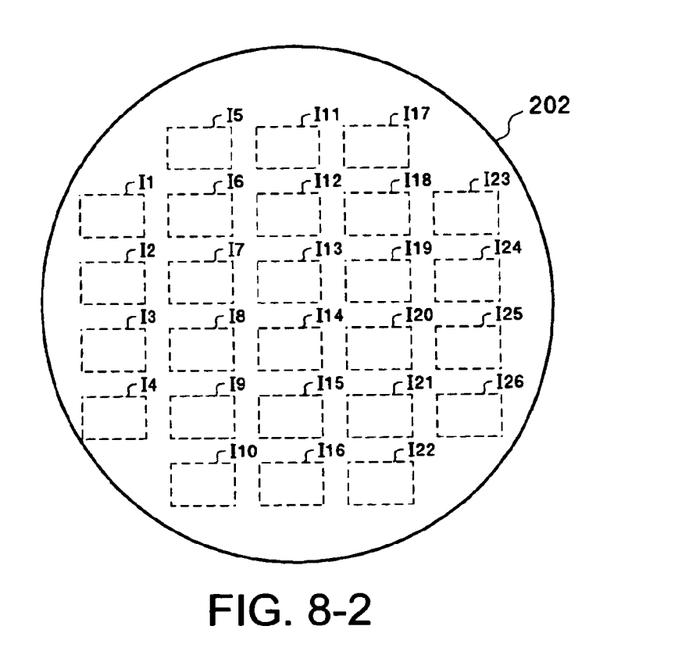
Figure 83:
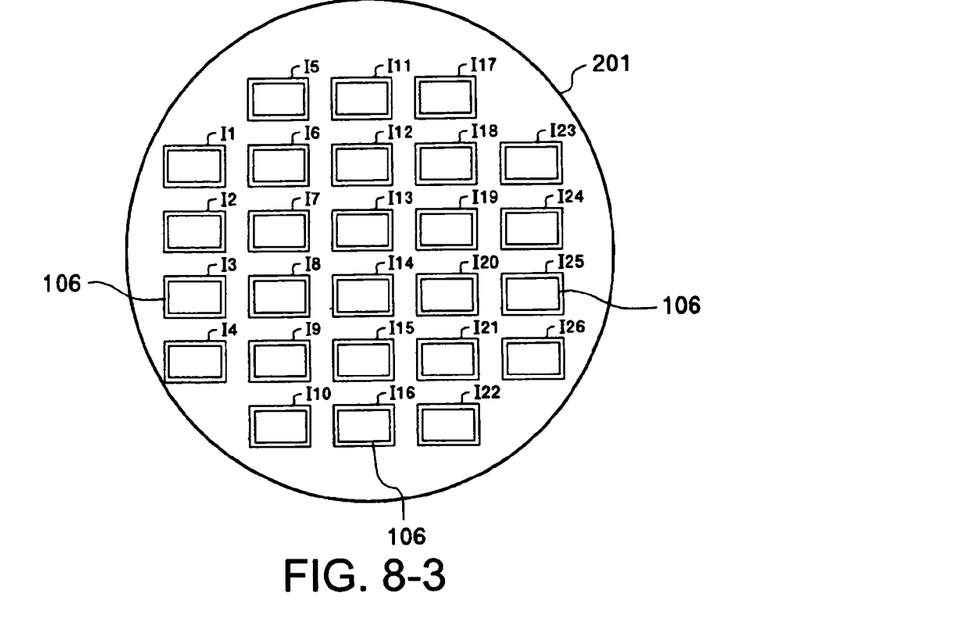

First, a transparent electrode 103b is formed on each cell forming area I1 to I26 inclusive on the surface of the first motherboard 201, shown in FIG. 8-1 (the transparent electrode forming process: S21). The orientation film 104b is formed on the transparent electrode 103b (the orientation film forming process: S22). Then, as shown in FIG. 8-3, the sealing material 106, constituted of light coagulated resin, is printed in the shape of frames onto the surface of the first motherboard 201, on which the electrode thereof is formed, along the edge of each cell forming areas I1 to I26 (the seal printing process: S23). The droplet discharge device 1, shown in FIG. 1, may be used for printing the sealing material.

Figure 84:
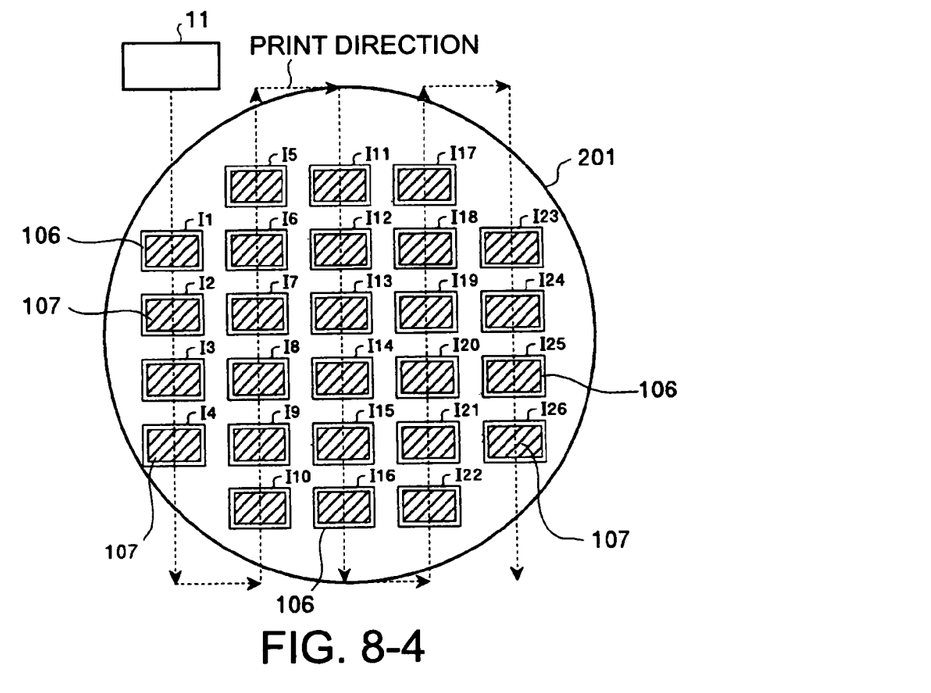

Second, as shown in FIG. 1, the first motherboard 201 is placed horizontally and supported on the table 16 of the droplet discharge device 1 facing the upper side of surface on which the sealing material 106 is applied. As shown in FIG. 8-4, the controller 15 of the droplet discharge device 1 lets the droplet discharge head 11 sequentially discharge the liquid crystal 107, according to the discharge condition calculated in the above-mentioned liquid crystal discharge condition calculation process (S13), toward each cell forming area I1 to I26 inclusive in the internal area of the sealing material 106 on the surface of the first motherboard 201 (the liquid crystal coating process: S24). The liquid crystal 107 discharged from the droplet discharge head 11 spreads evenly over the entire internal area of the sealing material 106 with a prescribed thickness.

A transparent electrode 103a is formed on each cell forming area I1 to I26 inclusive on the surface of the second motherboard 202 (the transparent electrode forming process: S25). Then, the orientation film 104a is formed on the transparent electrode 103a (the orientation film forming process: S26). Then, the spacer 105 is dispersed on the predetermined location of the orientation film 104a, and anchored (the spacers coating process: S27).

Thereafter, the second motherboard 201 is placed, overlapping over the first motherboard 201, whereas the surface the electrode is formed on faces downward. Then, prescribed pressure is added onto the second motherboard 202 downward. The distance between the motherboard 201 and the motherboard 202 is kept even with spacer 105. With this status, irradiating the ultra-violet rays hardens the sealing material 106. With this sealing material 106, the motherboard 201 and the motherboard 202 are adhered together and the large-sized panel structure that includes 26 liquid crystal panels 100a is formed (the adhering process: S28). It is desired that this adhering process be conducted inside the vacuum chamber, from the perspective of reducing or preventing the mixing of bubbles into the liquid crystal 107. Then, the large-sized panel structure is cut and 26 liquid crystal panels 100a is obtained (the cutting process: S29).

In the above exemplary embodiment, the single droplet discharge device 1 conducts the preliminary liquid crystal coating process and the liquid crystal film thickness measurement process. Yet different devices may conduct each process. Specifically, the liquid crystal coating process may be performed in a droplet discharge device, and the liquid crystal film thickness measurement process may be performed in the individually applied film thickness device.

Moreover, although in the above exemplary embodiment, the sealing material 106 is formed onto the first motherboard 201 on which the liquid crystal 107 is coated, the sealing material may be formed onto the second motherboard 202 side, or on both boards. The spacer 105 was dispersed on the second motherboard 202, but it can also be dispersed on the first motherboard 201 side, on which the liquid crystal 107 is coated. Additionally, although in the present exemplary embodiment, the liquid crystal 107 is coated on the first motherboard side, it can also be coated on the second motherboard 202 side.

As previously described, the above exemplary embodiment includes the following processes. The preliminary liquid crystal coating process (S11) coats with the liquid crystal, by scanning a plurality of the cell forming areas I1 to I26 inclusive, of the sample board 150 with the droplet discharge head 11 in a predetermined scanning direction, and by discharging the liquid crystal 107 with a predetermined discharge condition. The film thickness measurement process (S12) respectively measures the film thickness of liquid crystal coated onto the plurality of the cell forming areas. The liquid crystal discharge condition calculation process (S13) calculates the liquid crystal discharge condition to discharge to the plurality of the cell forming areas I1 to I26 inclusive from the droplet discharge head 11, based on the measuring result of film thickness in the film thickness measurement process (S12). The liquid crystal coating process (S24) coats with the liquid crystal in accordance with the liquid crystal discharge condition calculated in the droplet discharge condition calculation process (S13), by scanning the plurality of the cell forming areas I1 to I26 inclusive of the first motherboard 201 with the droplet discharge head 11 in the predetermined scanning direction.

Herewith, by keeping the film thickness of liquid crystal constant in each of the cell forming areas I1 to I26 inclusive, and by reducing or preventing the fluctuation of the film thickness of the liquid crystal, the cell gap in between the boards becomes even when boards are pasted together with the sealing material 106. The entire board can be pressurized with even pressure, thus enabling to reduce the fraction defective occurrence of the liquid crystal panels. Therefore, it is possible to provide the manufacturing method of liquid crystal display devices that can decrease the fraction defective of the liquid crystal panels, in case where the large-sized boards adhering model and the liquid crystal dropping model are used to produce the liquid crystal display device.

Moreover, according to the above exemplary embodiment example, the discharge condition of the liquid crystal 107 of the droplet discharge head 11 is calculated individually for each cell forming areas I1 to I26 inclusive, in the liquid crystal discharge condition calculation process (S13), based on the film thickness of liquid crystal 107 in the plurality of the cell forming areas I1 to I26 inclusive, measured in the film thickness measurement process (S12). Thus, it is possible to compensate for the difference between the theoretical value (the target film thickness) and the actual measured value (the measured film thickness) with high precision for each cell forming area I1 to I26 inclusive.

Further, according to the above exemplary embodiment, in the liquid crystal discharge condition calculation process (S13), the fluctuation pattern of the film thickness of the liquid crystal 107 measured in the film thickness measurement process (S12) on the plurality of the cell forming areas I1 to I26 inclusive is analyzed. The discharge condition of the liquid crystal 107 of the droplet discharge head 11, discharging to the plurality of the cell forming areas I1 to I26 inclusive, is calculated according the analyzed fluctuation pattern. This enables an easy compensation of the variation of the film thickness with regularity, thus enabling high precision compensation of the difference between the theoretical value (the target film thickness) and the actual measured value (the measured film thickness) for each cell forming area I1 to I26 inclusive. Moreover, according the above exemplary embodiment, the droplet discharge head 11 is warmed with a warmer. This enables to stabilize the discharge quantity of the liquid crystal by reducing the viscosity of the liquid crystal.

Application to the Electronic Appliances

Figure 91:
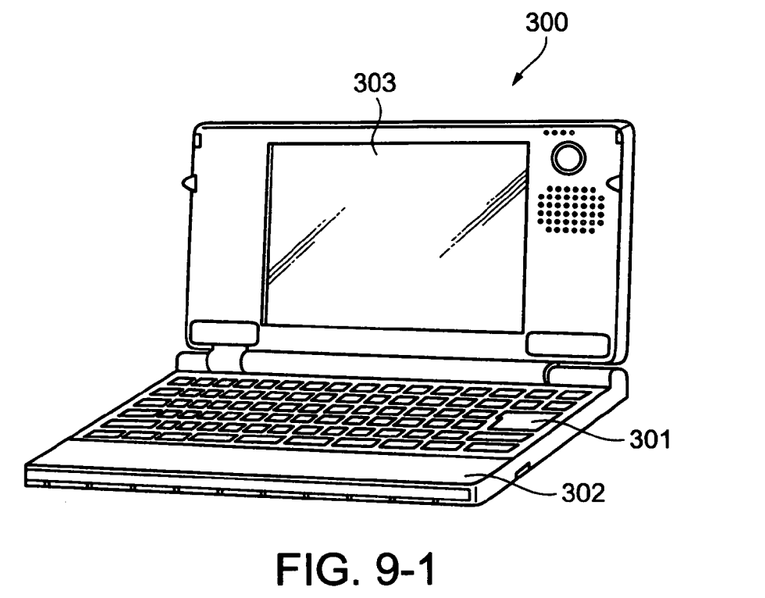
Figure 92:
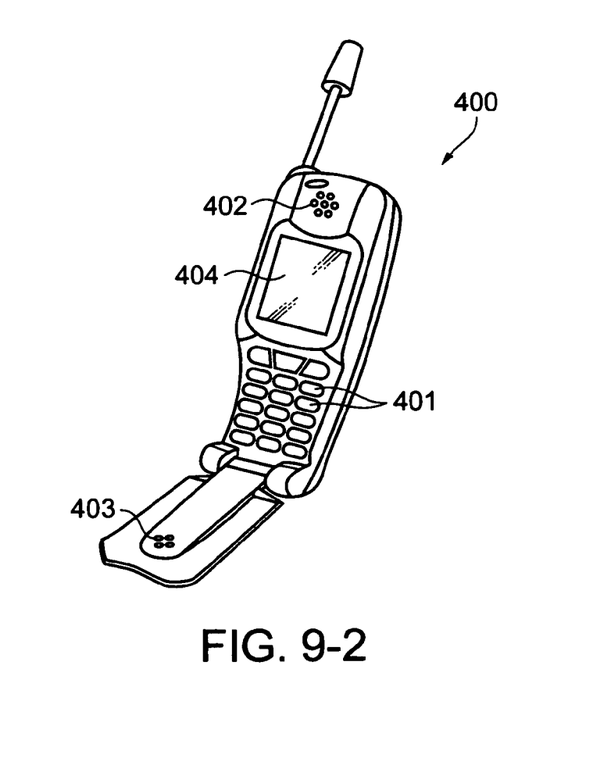

Hereafter, specific examples where the liquid crystal display device in an exemplary aspect of the present invention is applicable are explained, while referring to FIG. 9. FIG. 9-1 is a schematic, showing an example of the liquid crystal display device in an exemplary aspect of the present invention, applied to the display part of a portable personal computer 300 (typically called laptop type personal computer). As shown in this figure, the personal computer 300 is composed of a body part 302 equipped with keyboard 301, and of a display part 303 on which the liquid crystal display device in an exemplary aspect of the present invention is applied. FIG. 9-2 is a schematic, showing the example of the liquid crystal display device in an exemplary aspect of the present invention, applied to the display part of mobile phone equipment 400.

As shown in this figure, the mobile phone equipment 400 is composed of a plurality of operation buttons 401, a receiver 402, a transmitter 403, and a display part 404 in which the liquid crystal display device in an exemplary aspect of the present invention is applied.

The electronic devices in an exemplary aspect of the present invention can be widely applied to, in addition to the above-mentioned mobile phone equipment or laptop personal computer, electronic appliances, such as mobile-type information device called Personal Digital Assistant (PDA), personal computer, workstation, digital still camera, in-vehicle monitor, digital video camera, liquid crystal display television, viewfinder type or direct-view monitor type video tape recorder, car navigation device, pager, electronic notebook, calculator, word processor, workstation, videophone, and point-of-sale terminal, etc.

INDUSTRIAL APPLICABILITY

The droplet discharge device in an exemplary aspect of the present invention can be used widely in the various field of industrial film forming.

Moreover, the liquid crystal display device in an exemplary aspect of the present invention can be used for liquid crystal display devices of transparent type, reflective type, semitransparent type, monochrome type, and color type. The liquid crystal display device in an exemplary aspect of the present invention can also be used for passive matrix type liquid crystal display devices, or active matrix type liquid crystal display devices (for example, a liquid crystal panel equipped with TFT (thin film transistor) or TFD (thin film diode) for a switching device). The electronic devices, in which the liquid crystal display device in an exemplary aspect of the present invention is mounted, can be widely applied to electronic appliances, such as mobile phone equipment, mobile-type information equipment called Personal Digital Assistant (PDA), portable personal computer, personal computer, workstation, digital still camera, in-vehicle monitor, digital video camera, liquid crystal display television, viewfinder type or direct-view monitor type video tape recorder, car navigation device, pager, electronic notebook, calculator, word processor, workstation, videophone, and point-of-sale terminal, etc.

What is claimed is:

1. A manufacturing method of a liquid crystal display device dropping liquid crystal to at least either one of a first motherboard and a second motherboard, forming a large-sized panel structure that contains a plurality of liquid crystal panel units by pasting together the first motherboard and the second motherboard with sealing material, and cutting the plurality of liquid crystal panel units that contains a plurality of liquid panel units, the method comprising;

a preliminary liquid crystal coating process, to coat and discharge liquid crystal to a plurality of cell forming areas of a sample board as well as scan a droplet discharge head toward a predetermined scanning direction under a predetermined discharge condition;

a film thickness measurement process, to respectively measure each of the film thicknesses of liquid crystal coated onto the plurality of cell forming areas;

a liquid crystal discharge condition calculation process, to calculate a liquid crystal discharge condition to discharge liquid crystal to the plurality of cell forming areas from the droplet discharge head, based on a measuring result of film thicknesses in the film thickness measurement process; and a liquid crystal coating process, to coat liquid crystal to the plurality of cell forming areas in the first motherboard or the second motherboard as well as scan the droplet discharge head toward the predetermined scanning direction in accordance with the liquid crystal discharge condition calculated in the discharge condition calculation process, the liquid crystal discharge condition calculation process further comprising analyzing a fluctuation pattern of the film thickness of liquid crystal measured in the film thickness measurement process on the plurality of the cell forming areas, and calculating the liquid crystal discharge condition of the droplet discharge head discharging to the plurality of cell forming areas in accordance with the analyzed fluctuation pattern.

2. The manufacturing method according to claim 1, further including analyzing the fluctuation pattern of the film thickness of liquid crystal over at least one of the entire plurality of cell forming areas, by column and by row.

3. The manufacturing method according to claim 1, further including setting the discharge condition by a driving voltage waveform of the droplet discharge head and/or a liquid crystal dropping frequency.

4. The manufacturing method according to claim 1, further including warming the droplet discharge head by a warmer.

5. A liquid crystal display device manufactured with the manufacturing method according to claim 1.

6. An electronic device, provided with the liquid crystal display device according to claim 5.

* * * * *